US011136430B2

(12) United States Patent
Kawamura et al.

(10) Patent No.: US 11,136,430 B2
(45) Date of Patent: Oct. 5, 2021

(54) POLYURETHANE PREPOLYMER, ADHESIVE AND SYNTHETIC IMITATION LEATHER

(71) Applicant: DAINICHISEIKA COLOR & CHEMICALS MFG. CO., LTD., Chuo-ku (JP)

(72) Inventors: Ryo Kawamura, Kodaira (JP); Kazuya Sasaki, Abiko (JP); Toshiki Yamada, Kita-ku (JP)

(73) Assignee: DAINICHISEIKA COLOR & CHEMICALS MFG. CO., LTD., Chuo-ku (JP)

( * ) Notice: Subject to any disclaimer, the term of this patent is extended or adjusted under 35 U.S.C. 154(b) by 0 days.

(21) Appl. No.: 17/041,922

(22) PCT Filed: May 14, 2019

(86) PCT No.: PCT/JP2019/019015
§ 371 (c)(1),
(2) Date: Sep. 25, 2020

(87) PCT Pub. No.: WO2019/221090
PCT Pub. Date: Nov. 21, 2019

(65) Prior Publication Data
US 2021/0087323 A1  Mar. 25, 2021

(30) Foreign Application Priority Data
May 14, 2018 (JP) .............................. JP2018-092942

(51) Int. Cl.
| | |
|---|---|
| *C08G 18/12* | (2006.01) |
| *C08G 18/40* | (2006.01) |
| *C08G 18/42* | (2006.01) |
| *C08G 18/48* | (2006.01) |
| *C08G 18/76* | (2006.01) |
| *C09J 175/04* | (2006.01) |
| *D06N 3/14* | (2006.01) |
| *C08G 18/75* | (2006.01) |
| *C08G 18/73* | (2006.01) |
| *C08G 18/72* | (2006.01) |
| *B32B 37/12* | (2006.01) |

(52) U.S. Cl.
CPC ......... *C08G 18/12* (2013.01); *C08G 18/4018* (2013.01); *C08G 18/4216* (2013.01); *C08G 18/4238* (2013.01); *C08G 18/4854* (2013.01); *C08G 18/724* (2013.01); *C08G 18/73* (2013.01); *C08G 18/755* (2013.01); *C08G 18/7642* (2013.01); *C08G 18/7671* (2013.01); *C09J 175/04* (2013.01); *D06N 3/14* (2013.01); *D06N 3/147* (2013.01); *B32B 37/12* (2013.01)

(58) Field of Classification Search
CPC  C08G 18/12; C08G 18/4018; C08G 18/7671; C08G 18/4854; C08G 18/4216; C08G 18/4238; C08G 18/724; C08G 18/755; C08G 18/7642; C08G 18/73; C09J 175/04; D06N 3/147; D06N 3/14; B32B 37/12

See application file for complete search history.

(56) References Cited

U.S. PATENT DOCUMENTS

| | | | | |
|---|---|---|---|---|
| 5,599,895 | A | * | 2/1997 | Heider ............... C09J 175/06 528/59 |
| 5,932,680 | A | * | 8/1999 | Heider ............... C08G 18/12 528/59 |
| 5,965,662 | A | * | 10/1999 | Krebs ................ C08G 18/089 524/590 |
| 2009/0208759 | A1 | | 8/2009 | Kanagawa et al. |
| 2014/0242396 | A1 | * | 8/2014 | Kanagawa ......... C08G 18/6229 428/423.1 |
| 2014/0256875 | A1 | | 9/2014 | Li et al. |
| 2015/0099125 | A1 | * | 4/2015 | Kanagawa ......... C08G 18/7657 428/411.1 |
| 2020/0407610 | A1 | * | 12/2020 | Kinoshita .............. C09J 175/06 |

FOREIGN PATENT DOCUMENTS

| | | |
|---|---|---|
| CN | 1133303 A | 10/1996 |
| CN | 101463242 A | 6/2009 |
| CN | 103044665 A | 4/2013 |

(Continued)

OTHER PUBLICATIONS

International Search Report dated Aug. 6, 2019 in PCT/JP2019/019015 filed on May 14, 2019, 2 pages.
Combined Chinese Office Action and Search Report dated Feb. 8, 2021 in Chinese Patent Application No. 201980023072.9, 7 pages.
Office Action as received in the corresponding CN Patent Application No. 201980023072.9 dated Jun. 29, 2021 w/English Translation, Citing documents AW, 24 pages.

*Primary Examiner* — Rabon A Sergent
(74) *Attorney, Agent, or Firm* — Oblon, McClelland, Maier & Neustadt, L.L.P.

(57) ABSTRACT

A polyurethane prepolymer produced by reacting a polyol and a polyisocyanate, wherein the polyol contains a polyether polyol (A) in an amount of 30% by mass or more, a polyester polyol (B) containing an isophthalic acid-derived structure and a sebacic acid-derived structure as partial structures derived from a dibasic acid in an amount of 30% by mass or more, and a polyester polyol (C) containing only a sebacic acid-derived structure as a partial structure derived from a dibasic acid in an amount of 20% by mass or less, the number-average molecular weight of the polyether polyol (A) is 1100 to 2400, and the ratio of the isocyanate equivalent of the polyisocyanate to the hydroxyl equivalent of the polyol is 2.1 or less.

10 Claims, No Drawings

(56) References Cited

FOREIGN PATENT DOCUMENTS

| | | |
|---|---|---|
| CN | 103614108 A | 3/2014 |
| JP | 55-63482 A | 5/1980 |
| JP | 2006-273986 A | 10/2006 |
| JP | 2007-63510 A | 3/2007 |
| JP | 2013-43914 A | 3/2013 |
| JP | 2015-196768 A | 11/2015 |
| JP | 2019-77817 A | 5/2019 |
| WO | WO 2008/065921 A1 | 6/2008 |
| WO | 2017/104266 | 6/2017 |

\* cited by examiner

POLYURETHANE PREPOLYMER, ADHESIVE AND SYNTHETIC IMITATION LEATHER

TECHNICAL FIELD

The present invention relates to a polyurethane prepolymer, an adhesive and a synthetic artificial leather.

BACKGROUND ART

A polyurethane prepolymer is used for adhesives, paints, sealants and the like, and in particular, as curing with moisture in air, a moisture-curable polyurethane prepolymer has the advantage of being usable as a one-component agent. Such a polyurethane prepolymer is a compound having a functional group (e.g., isocyanate group) capable of reacting with water (moisture) existing in air or in a substrate to which it is applied, to form a crosslinked structure, and is liquid or solid at room temperature in an uncured state, and a wide variety of polyurethane prepolymers have been developed in accordance with the intended purposes.

For example, PTL 1 discloses a liquid polyurethane prepolymer produced by reacting a 4,4'-diphenylmethane diisocyanate, at least one polyether polyol, and at least one polyester polyol containing an isophtalic acid moiety and an adipic acid moiety as partial structures derived from a dibasic acid but not substantially containing a phthalic acid moiety and a terephthalic acid moiety. The literature describes that the liquid polyurethane prepolymer can cure when exposed to moisture or an active hydrogen-containing curing agent, and is useful in production of a non-solvent adhesive that exhibits good adhesiveness to a surface having a low surface energy of such as ABS (acrylonitrile-butadiene-styrene copolymer).

Also as an adhesive for use in producing synthetic artificial leathers such as artificial leathers or synthetic leathers, a polyurethane prepolymer is used. Those synthetic artificial leathers are used in various applications for shoes, clothing, bags, furniture, vehicle interior materials (e.g., instrument panels, doors, consoles, seats), etc. A synthetic artificial leather is generally a laminate having a skin layer, an adhesive layer and a substrate layer, and in forming the adhesive layer, various polyurethane prepolymers are used. In the above-mentioned use, in particular, good flexibility in a cold area, that is, cold-resistant flexibility is required, in addition to good softness.

CITATION LIST

Patent Literature

PTL 1: JP 5563482

SUMMARY OF INVENTION

Technical Problem

Many substrates used for synthetic artificial leathers are porous, and when an ordinary polyurethane prepolymer is applied to such substrates, it may penetrate into the inside thereof and could not provide an adhesion strength. Specifically, for bonding to the above-mentioned substrates, penetration needs to be suppressed in some degree, but PTL 1 does not describe the problem at all.

Further, when curability is controlled to secure a curing time (open time) in some degree, it may bring about an advantage of improving workability in shaping into complicated forms.

From the above, the present invention is to provide a polyurethane prepolymer capable of exhibiting good softness and cold-resistant flexibility and having excellent curability.

Solution to Problem

As a result of assiduous studies made for solving the above-mentioned problems, the present inventors have found that a polyurethane prepolymer produced by reacting a polyol that contains specific three kinds of polyols and a polyisocyanate in a specific equivalent ratio can solve the problems, and have reached the present invention. Specifically, the present invention is as follows.

[1] A polyurethane prepolymer produced by reacting a polyol and a polyisocyanate, wherein the polyol contains a polyether polyol (A) in an amount of 30% by mass or more, a polyester polyol (B) containing an isophthalic acid-derived structure and a sebacic acid-derived structure as partial structures derived from a dibasic acid in an amount of 30% by mass or more, and a polyester polyol (C) containing only a sebacic acid-derived structure as a partial structure derived from a dibasic acid in an amount of 20% by mass or less, the number-average molecular weight of the polyether polyol (A) is 1100 to 2400, and the ratio of the isocyanate equivalent of the polyisocyanate to the hydroxyl equivalent of the polyol is 2.1 or less.

[2] The polyurethane prepolymer according to [1], wherein the polyisocyanate contains 4,4'-diphenylmethane diisocyanate.

[3] The polyurethane prepolymer according to [1] or [2], wherein the ratio of the isocyanate equivalent of the polyisocyanate component to the hydroxyl equivalent of the polyol is 1.5 to 2.1.

[4] The polyurethane prepolymer according to any of [1] to [3], wherein the polyisocyanate contains a linear aliphatic diisocyanate having 4 to 10 carbon atoms, and contains the linear aliphatic diisocyanate having 4 to 10 carbon atoms in an amount of 10 to 50 mol %.

[5] The polyurethane prepolymer according to any of [1] to [4], wherein the polyether polyol (A) contains a polyether polyol (A-1) having a number-average molecular weight of 700 to 1300 and a polyether polyol (A-2) having a number-average molecular weight of 2700 to 3300 in a ratio by mass of 30/70 to 70/30.

[6] The polyurethane prepolymer according to any of [1] to [5], having a softening point falling within a range of 30 to 100° C. and a melt viscosity at 100° C. of 110 dPa·s or less.

[7] The polyurethane prepolymer according to any of [1] to [6], containing a polyisocyanate crosslinking agent having a terminal isocyanate group having 3 to 5 functional groups in an amount of 30 parts by mass or less relative to 100 parts by mass of the polyurethane prepolymer.

[8] An adhesive containing the polyurethane prepolymer of any of [1] to [7].

[9] The adhesive according to [8], for use for synthetic artificial leathers.

[10] A synthetic artificial leather having an adhesive layer between a skin layer and a substrate, wherein the adhesive layer is a cured layer of the polyurethane prepolymer of any of [1] to [7].

Advantageous Effects of Invention

According to the present invention, there can be provided a urethane prepolymer capable of exhibiting good softness and cold-resistant flexibility and having excellent curability. In this description, "excellent curability" means a property of the prepolymer that starts to cure rapidly after sticking while securing a time of keeping tackiness thereof until bonding to a substrate in a step of bonding to a substrate after application of the prepolymer thereto.

DESCRIPTION OF EMBODIMENTS

Hereinunder, embodiments of the present invention (this embodiment) are described in detail, but the present invention is not limited to the embodiment.

1. Polyurethane Prepolymer

The polyurethane prepolymer of this embodiment is produced by reacting a specific polyol and a polyisocyanate. As the specific polyol, at least three kinds of a polyether polyol (A), a polyester polyol (B), and a polyester polyol (C) are used, and the content of these three is controlled so as to provide good softness and cold-resistant flexibility and also to exhibit excellent curability. For example, it is presumed that the polyether polyol (A) may act to exhibit good softness and cold-resistant flexibility, and the polyester polyol (C) containing a sebacic acid-derived structure may act to exhibit curability, and further, the polyester polyol (B) containing an isophthalic acid-derived structure and a sebacic acid-derived structure may secure a good balance between the effect of the polyether polyol (A) and that of the polyester polyol (C) thereby to mainly exhibit the effect of the present invention.

In addition, the constitution and the amount of the polyisocyanate and the polyol are optimized to more effectively exhibit the effect of the invention.

(Polyol)

The polyol contains a polyether polyol (A) in an amount of 30% by mass or more, a polyester polyol (B) containing an isophthalic acid-derived structure and a sebacic acid-derived structure as partial structures derived from a dibasic acid in an amount of 30% by mass or more, and a polyester polyol (C) containing only a sebacic acid-derived structure as a partial structure derived from a dibasic acid in an amount of 20% by mass or less.

(1) Polyether Polyol (A):

As described previously, the polyether polyol (A) in the polyol accounts for 30% by mass or more. When the polyether polyol (A) is less than 30% by mass, good cold-resistant flexibility could not be attained. Preferably, the polyether polyol (A) is 35 to 80% by mass, more preferably 40 to 70% by mass.

Examples of the polyether polyol (A) include polyoxytetramethylene glycol (PTMG), polyoxypropylene glycol (PPG), polyoxyethylene glycol (PEG), EO/PO copolymer, and EO/THF copolymer. From the viewpoint of good cold-resistant flexibility and softness, polyoxytetramethylene glycol (PTMG) is preferred.

The number-average molecular weight of the polyether polyol (A) is, from the viewpoint of good cold-resistant flexibility, 1100 to 2400, preferably 1150 to 2300, more preferably 1200 to 2200.

Preferably, the polyether polyol (A) contains a polyether polyol (A-1) having a number-average molecular weight of 700 to 1300 and a polyether polyol (A-2) having a number-average molecular weight of 2700 to 3300 in a ratio by mass of 30/70 to 70/30, more preferably in a ratio by mass of 40/60 to 60/40. When containing the two in a ratio by mass of 30/70 to 70/30, the molecular weight distribution of the polyether polyol (A) can be broad to readily provide good cold-resistant flexibility.

(2) Polyester Polyol (B):

As described previously, the polyester polyol (B) in the polyol accounts for 30% by mass or more. When the polyester polyol (B) is less than 30% by mass, it would be difficult to achieve both good cold-resistant flexibility and curability. Preferably, the polyester polyol (B) is 30 to 60% by mass, more preferably 30 to 50% by mass.

Among the isophthalic acid-derived structure and the sebacic acid-derived structure as partial structures derived from a dibasic acid of the polyester polyol (B), the isophthalic acid-derived structure (isophthalic acid residue) mainly contributes toward softness and curability, and the sebacic acid-derived structure (sebacic acid residue) contributes toward excellent curability. Namely, it is considered that these structures may synergistically act on the polyether polyol (A) and the polyester polyol (C) to further better cold-resistant flexibility and softness to thereby more effectively exhibit excellent curability.

The isophthalic acid-derived structure and the sebacic acid-derived structure to form partial structures derived from a dibasic acid are, from the viewpoint of better cold-resistant flexibility, preferably such that the molar ratio thereof (isophthalic acid-derived structure/sebacic acid-derived structure) is 30/70 to 70/30, more preferably 45/65 to 65/45.

The total amount of the isophthalic acid-derived structure and the sebacic acid-derived structure to form partial structures derived from a dibasic acid, as acid components of the polyester polyol (B), is preferably 50 mol % or more, more preferably 70 mol % or more. When the total amount is 70 mol % or more, a tough structure can be produced. The other acid component to form partial structures derived from a dibasic acid than the isophthalic acid-derived structure and the sebacic acid-derived structure to form partial structures derived from a dibasic acid includes a dibasic acid such as terephthalic acid, malonic acid, glutaric acid, pimellic acid, suberic acid, succinic acid, adipic acid, azelaic acid, and dodecane-diacid.

The alcohol component to constitute the polyester polyol (B) includes ethylene glycol, diethylene glycol, triethylene glycol, propylene glycol, 1,2-propanediol, n-propanediol, 1,3-butanediol, 1,4-butanediol, 1,5-pentanediol, 1,6-hexanediol, hexylene glycol, 3-methyl-1,5-pentanediol, 2-ethyl-1,3-hexanediol, 1,9-nonanediol, and neopentyl glycol.

The molecular weight of the polyester polyol (B) is, as a number-average molecular weight, preferably 1500 to 4000, more preferably 2000 to 3500. When the number-average molecular weight is 1500 to 4000, good cold-resistant flexibility can be secured. One alone or two or more kinds of polyester polyols (B) can be used either singly or as combined.

The polyester polyol (B) can be produced, for example, from an isophthalic acid to be a phthalic acid-derived structure, a sebacic acid to be a sebacic acid-derived structure, and a previously-described alcohol component.

(3) Polyester Polyol (C):

As previously described, the polyester polyol (C) in the polyol accounts for 20% by mass or less. When the polyester polyol (C) is more than 20% by mass, excellent curability could hardly be achieved. On the other hand, in the absence of the polyester polyol (C), the prepolymer could not cure, or would take too much time and good curability could hardly be achieved. From these viewpoints, the polyester polyol (C) is preferably 5 to 20% by mass, more preferably 10 to 15% by mass.

The polyester polyol (C) containing a sebacic acid-derived structure alone as a partial structure derived from a dibasic acid mainly contributes toward expressing excellent curability owing to the sebacic acid-derived structure thereof.

The alcohol component to constitute the polyester polyol (C) includes ethylene glycol, diethylene glycol, triethylene glycol, propylene glycol, 1,2-propanediol, n-propanediol, 1,3-butanediol, 1,4-butanediol, 1,5-pentanediol, 1,6-hexanediol, hexylene glycol, 3-methyl-1,5-pentanediol, 2-ethyl-1,3-hexanediol, 1,9-nonanediol, and neopentyl glycol.

The number-average molecular weight of the polyester polyol (C) is preferably 2000 to 6000, more preferably 3000 to 5000. When the number-average molecular weight is 2000 to 6000, excellent curability can be expressed to secure good workability.

The polyester polyol (C) can be produced from, for example, a sebacic acid to be a sebacic acid-derived structure, and a previously-described alcohol component.

In the polyol in this embodiment, the total content of the polyether polyol (A), the polyester polyol (B) and the polyester polyol (C) is preferably 65% by mass or more, more preferably 80% by mass or more, even more preferably 100% by mass. In the case where the total content is not 100% by mass, the other polyol includes an acrylic polyol, a polyolefin polyol, a polybutadiene polyol, a polyisoprene polyol, a rosin-modified polyol, a polyethylene-butylene polyol, a polycarbonate polyol, and a polycaprolactone polyol.

(Polyisocyanate)

The polyisocyanate to be used as a component to synthesize the urethane prepolymer of this embodiment is, though not specifically limited thereto, preferably a bifunctional polyisocyanate such as an aliphatic diisocyanate, an alicyclic diisocyanate, or an aromatic diisocyanate.

Specific examples of the polyisocyanate include tolylene diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate-diphenyl ether, methylene diisocyanate, 4,4'-diphenylmethane diisocyanate, jurylene diisocyanate, 1,5-naphthalene diisocyanate, benzidine diisocyanate, o-nitrobenzidine diisocyanate, 4,4'-diisocyanate dibenzyl, 1,4-tetramethylene diisocyanate, 1,5-pentamethylene diisocyanate, 1,6-hexamethylene diisocyanate, 1,10-decamethylene diisocyanate, 1,4-cyclohexylene diisocyanate, xylylene diisocyanate, 4,4'-methylenebis(cyclohexyl isocyanate), 1,5-tetrahydronaphthalene diisocyanate, isophorone diisocyanate, and dicyclohexylmethane 4,4'-diisocyanate. Above all, 4,4'-diphenylmethane diisocyanate is preferably contained.

In the case of requiring lightfastness for vehicle use or for pale tone use, preferably, an aliphatic diisocyanate or an alicyclic diisocyanate is combined with 4,4'-diphenylmethane diisocyanate.

Preferably, the polyisocyanate contains a linear aliphatic diisocyanate having 4 to 10 carbon atoms, and contains the linear aliphatic diisocyanate having 4 to 10 carbon atoms in an amount of 10 to 50 mol %, more preferably 20 to 40 mol %. When a linear aliphatic diisocyanate having 4 to 10 carbon atoms is contained in an amount of 10 to 50 mol %, better curability can be exhibited. As the linear aliphatic diisocyanate having 4 to 10 carbon atoms, 1,5-pentamethylene diisocyanate and 1,6-hexamethylene diisocyanate are preferred.

The ratio of the polyol to the polyisocyanate is such that the ratio of the isocyanate equivalent of the polyisocyanate component to the hydroxyl equivalent of the polyol (molar ratio of NCO/OH) is 2.1 or less, preferably 1.5 to 2.1, more preferably 1.7 to 2.0. When NCO/OH is more than 2.1, softness and cold-resistant flexibility may readily worsen.

The urethane prepolymer of this embodiment may contain, as blended therein, a polyisocyanate crosslinking agent having a terminal isocyanate group having 3 to 5 functional groups as a formulation ingredient therein. From the viewpoint of curability and adhesiveness to substrates, preferably, the amount of the polyisocyanate crosslinking agent is 30% by mass or less relative to 100 parts by mass of the polyurethane prepolymer, more preferably 2 to 20% by mass.

Also preferably, the urethane prepolymer of this embodiment has a softening point falling within a range of 30 to 100° C. and a melt viscosity at 100° C. of 110 dPa·s or less. More preferably, the softening point falls within a range of 50 to 80° C. Also more preferably, the melt viscosity at 100° C. is 40 to 110 dPa·s. When the softening point falls within a range of 30 to 100° C. and when the viscosity at 100° C. is 110 dPa·s or less, good workability can be secured.

A production method for the polyurethane prepolymer of this embodiment is not specifically limited. For example, the previously described polyol and polyisocyanate are mixed so that NCO/OH could be 2.1 or less, and reacted at 80 to 120° C. for 60 to 120 minutes or so to produce the polyurethane prepolymer.

The urethane prepolymer of this embodiment as mentioned above can be effectively used for adhesives to be mentioned below, and also for paints and sealants.

2. Adhesive

The adhesive of this embodiment contains the polyurethane prepolymer of the present invention. The adhesive of this embodiment may contain any of a thermoplastic polymer, a tackifying resin, a catalyst, a pigment, an antioxidant, a absorbent, a surfactant, a flame retardant, a filler, a foaming agent, and the like in an appropriate amount, as needed, but is preferably formed of the polyurethane prepolymer. Also preferably, the adhesive of this embodiment is for use for synthetic artificial leathers, that is, an adhesive for synthetic artificial leathers.

When applied to the surfaces of adherends, the adhesive of this embodiment can readily adhere the adherends. The adherends include substrates for synthetic artificial leathers and, in addition thereto, for example, substrates of metals or non-metals (e.g., polycarbonate, glass).

3. Synthetic Artificial Leather

The synthetic artificial leather of this embodiment has an adhesive layer between a skin layer and a substrate, wherein the adhesive layer is a cured layer of the polyurethane prepolymer of this embodiment.

As the substrate, any conventionally-known substrates for synthetic artificial leathers are employable, and examples thereof include woven fabrics such as twills or plain-woven fabrics, raised cloths produced by mechanically raising the cotton of those fabrics, as well as rayon cloths, nylon cloths, polyester cloths, Kevlar cloths, nonwoven fabrics (polyesters, nylons, various latexes), and various films and sheets.

Not specifically limited, the skin layer may be any one formed of a surface layer-forming paint such as a solvent-based polyurethane, a water-based polyurethane, or TPU.

Synthetic artificial leathers can be produced, for example, as follows. First, a skin layer-forming paint for forming a skin layer is applied to a release paper according to a known method of comma coating, knife coating, roll coating, gravure coating, die coating, or spray coating. This is appropriately dried to form a skin layer. Onto the skin layer, the urethane prepolymer of the present invention or the adhesive of the present invention is applied according to a known method of comma coating, knife coating, or roll coating. Subsequently, this is pressure-bonded to a substrate. Further, this is aged and released from the release paper to give a synthetic artificial leather of this embodiment.

The synthetic artificial leather of this embodiment as mentioned above is favorable for shoes, clothing, bags, furniture, vehicle interior materials (e.g., instrument panels, doors, consoles, seats), etc.

EXAMPLES

Next, the present invention is described in more detail with reference to Examples and Comparative Examples. Needless-to-say, the present invention is not restricted by Examples. The number-average molecular weight was measured through GPC (polystyrene equivalent).

Examples 1 to 10 (PU1 to 10) and Comparative Examples 1 to 5 (PU11 to 15)

A polyether polyol (A-1), a polyether polyol (A-2), a polyether polyol (A-3), a polyester polyol (B) having an isophthalic acid-derived structure and a sebacic acid-derived structure as partial structures derived from a dibasic acid, a polyester polyol (C) having a sebacic acid-derived structure alone as a partial structure derived from a dibasic acid, and a polyisocyanate were put into a 500-ml glass reactor equipped with a stirrer, a thermometer and a gas-introducing mouth, each in a predetermined amount as shown in Table 1 (NCO/OH=1.5 to 2.2), then heated and depressurized, and dewatered, purged with nitrogen gas, and reacted with stirring at an internal temperature of 120° C. for 90 minutes to give polyurethane prepolymers PU1 to 15.

The polyols and the polyisocyanates used in Examples and Comparative Examples are as follows.
(1) Polyether polyol (A-1): polyTHF 1000 (from BASF Corporation, polyoxytetramethylene glycol having a number-average molecular weight 1000)
(2) Polyether polyol (A-2): polyTHF 3000 (from BASF Corporation, polyoxytetramethylene glycol having a number-average molecular weight 3000)
(3) Polyether polyol (A-3): polyTHF 1500 (from BASF Corporation, polyoxytetramethylene glycol having a number-average molecular weight 1500)
(4) Polyester polyol (B): HS2F-305S (from Hokoku Corporation, number-average molecular weight 3100)
(5) Polyester polyol (C): HS2H-500S (from Hokoku Corporation, number-average molecular weight 5000)
(6) Polyisocyanate: 4,4'-diphenylmethane diisocyanate (MDI)

Examples 11 to 16 (PU16 to 21)

A polyether polyol (A-1), a polyether polyol (A-2), a polyester polyol (B) having an isophthalic acid-derived structure and a sebacic acid-derived structure as partial structures derived from a dibasic acid, a polyester polyol (C) having a sebacic acid-derived structure alone as a partial structure derived from a dibasic acid, and a polyisocyanate shown in Table 2 were put into a 500-ml glass reactor equipped with a stirrer, a thermometer and a gas-introducing mouth, each in a predetermined amount as shown in Table 1 (NCO/OH=1.9), then heated and depressurized, and dewatered, purged with nitrogen gas, and reacted with stirring at an internal temperature of 100° C. for 120 minutes to give polyurethane prepolymers PU16 to 21.

The polyisocyanates shown in Table 2 are as follows.
(7) MDI: 4,4'-diphenyulmethane diisocyanate
(8) 1,5-PDI: 1,5-pentamethylene diisocyanate (having a biomass ratio of 70% by weight)
(9) 1,6-HDI: 1,6-hexamethylene diisocyanate
(10) IPDI: isophorone diisocyanate
(11) XDI: m-xylene diisocyanate Measurement of Melt Viscosity Using a BM-type viscometer (by Tokyo Keiki Corp.), the melt viscosity of the polyurethane prepolymers PU1 to 21 was measured under the condition of Rotor No. 4/30 rpm/100° C. The evaluation indices are as mentioned below. The results are shown in Table 1 and Table 2.
A: 70 to 90 dPa·s
B: 50 to 69 dPa·s, or 91 to 110 dPa·s
C: 40 to 49 dPa·s, or 110 to 120 dPa·s
D: falling outside the above ranges.

Measurement of Softening Point

According to a solid-liquid judgement test based on "ASTM D 4359-90: Standard Test Method for Determining Whether a Material is a Liquid or Solid", the softening point of the polyurethane prepolymers PU1 to 21 was measured. The results are shown in Table 1 and Table 2.

Production and Evaluation of Synthetic Artificial Leather

Formation of Skin Layer

As a skin for synthetic artificial leathers, a solvent-based urethane resin Resamine NE-8875-30 (from Dainichiseika Color & Chemicals Mfg. Co., Ltd.), as a colorant for synthetic artificial leathers, Seika Seven BS-780 (Dainichiseika Color & Chemicals Mfg. Co., Ltd.), and as diluent solvents, methyl ethyl ketone (MEK) and dimethylformamide (DMF) were mixed, and uniformly applied onto a release paper in a coating amount of 250 μm/wet, using a bar coater, and then dried at 120° C. for 5 minutes to form a skin layer having a thickness of 40 to 50 μm.

Production of Standard Synthetic Artificial Leather for Softness Evaluation

An adhesive prepared by blending 100 parts by mass of Resamine UD-8351NT (polyurethane resin adhesive, from Dainichiseika Color & Chemicals Mfg. Co., Ltd.) and 10 parts by mass of C-50 crosslinking agent (isocyanate crosslinking agent, from Dainichiseika Color & Chemicals Mfg. Co., Ltd.) was applied onto the skin layer formed on the release paper to form an adhesive layer having a thickness of 100 μm, then pre-dried at 80° C. for 2 minutes, and the resultant adhesive layer was press-bonded to a substrate (woven fabric) using a lamination roll at 40° C. Subsequently, this was aged under the condition of 50° C./48 hours to prepare a standard synthetic artificial leather for softness evaluation.

Production of Synthetic Artificial Leathers of Examples and Comparative Examples The polyurethane prepolymer PU1-21 heated at 100° C. was applied to the skin layer formed on the release paper so as to have a coating thickness of 100 μm, and then pressure-bonded to a substrate (woven fabric) using a lamination roll at 100° C. In an aging step, this was aged in an environment at a temperature of 25° C. and a relative humidity of 65% for 5 days. Peeled from the release paper, synthetic artificial leathers for evaluation using polyurethane prepolymers PU1-21 were produced.

Softness Evaluation

The softness of the resultant synthetic artificial leathers was checked by hand touch, based on the standard synthetic artificial leather prepared as a reference. The evaluation indices are as follows. A, B and C are acceptable.
A: Softer than standard synthetic artificial leather.
B: Soft on the same level as that of standard synthetic artificial leather.
C: A little harder than standard synthetic artificial leather.
D: Much harder than standard synthetic artificial leather.

Cold-Resistant Flexibility Test

The synthetic artificial leather produced in the above was cut into a sample sheet having a width of 50 mm and a length of 150 mm (inspection range 100 mm), and using a DeMattia flexing tester (from Yasuda Seiki Co., Ltd., Model Number: NO. 119-L DEMATTIA FLEXING TESTER), the sample sheet was tested in a flexing test at a low temperature of −10° C. in an environment of −10° C. and in a stretching flexing range of 72 to 108%. The evaluation indices are as follows. A, B and C are acceptable.
A: Not cracked after 40000 times flexing.
B: Not cracked after 30000 times flexing, but cracked before 40000 times flexing.
C: Not cracked after 10000 times flexing, but cracked before 30000 times flexing.
D: Cracked after 10000 times flexing.

Curability Evaluation

The curability of the adhesive was evaluated as follows. After the skin layer was coated with the polyurethane prepolymer PU1-21, the coating layer surface was touched by fingers, and the time taken until the surface lost tackiness was read to indicate the curability of the adhesive. A curing time falling within a range of 3 to 24 minutes is acceptable, and above all, the time falling within a range of 7 to 18 minutes is good, and the time of 9 to 12 minutes is better.

TABLE 1

| | | | PU No. | | | | | | | |
|---|---|---|---|---|---|---|---|---|---|---|
| | | | PU1 Example 1 | PU2 Example 2 | PU3 Example 3 | PU4 Example 4 | PU5 Example 5 | PU6 Example 6 | PU7 Example 7 | PU8 Example 8 |
| Formulation | Polyether Polyol (A) | (A-1) | 30 | 42 | 18 | 20 | 27.5 | 30 | 30 | 0 |
| | | (A-2) | 30 | 18 | 42 | 20 | 27.5 | 30 | 30 | 0 |
| | | (A-1)/(A-2) | 50/50 | 70/30 | 30/70 | 50/50 | 50/50 | 50/50 | 50/50 | — |
| | | (A-3) | 0 | 0 | 0 | 0 | 0 | 0 | 0 | 60 |
| | | Number-average Molecular Weight of (A) | 1500 | 1250 | 1875 | 1500 | 1500 | 1500 | 1500 | 1500 |
| | Polyester Polyol (B) | | 30 | 30 | 30 | 50 | 30 | 30 | 30 | 30 |
| | Polyester Polyol (C) | | 10 | 10 | 10 | 10 | 20 | 10 | 10 | 10 |
| | Polyisocyanate | MDI | 24.5 | 28.3 | 20.7 | 21.3 | 23.4 | 22.0 | 27.1 | 24.5 |
| | NCO/OH molar ratio | | 1.9 | 1.9 | 1.9 | 1.9 | 1.9 | 1.7 | 2.1 | 1.9 |
| Solution Characteristics | Softening Point (° C.) | | 60 | 55 | 65 | 50 | 75 | 80 | 50 | 50 |
| | Melt Viscosity | | A | B | B | B | A | B | B | B |
| Leather Characteristics | Softness | | B | B | A | A | B | A | B | B |
| | Cold-resistant Flexibility | | A | B | A | A | B | A | B | C |
| | Curability (min) | | 15 | 12 | 16 | 18 | 8 | 10 | 16 | 8 |

| | | | PU No. | | | | | | | |
|---|---|---|---|---|---|---|---|---|---|---|
| | | | PU9 Example 9 | PU10 Example 10 | PU11 Comparative Example 1 | PU12 Comparative Example 2 | PU13 Comparative Example 3 | PU14 Comparative Example 4 | PU15 Comparative Example 5 | PU16 Comparative Example 6 |
| Formulation | Polyether Polyol (A) | (A-1) | 15 | 30 | 37.5 | 35 | 20 | 30 | 6 | 54 |
| | | (A-2) | 15 | 30 | 37.5 | 35 | 20 | 30 | 54 | 6 |
| | | (A-1)/(A-2) | 50/50 | 50/50 | 50/50 | 50/50 | 50/50 | 50/50 | 10/90 | 90/10 |
| | | (A-3) | 0 | 0 | 0 | 0 | 0 | 0 | 0 | 0 |
| | | Number- | 1500 | 1500 | 1500 | 1500 | 1500 | 1500 | 2500 | 1071 |

TABLE 1-continued

|  |  |  |  |  |  |  |  |  |  |
|---|---|---|---|---|---|---|---|---|---|
|  | average Molecular Weight of (A) |  |  |  |  |  |  |  |  |
|  | Polyester Polyol (B) | 60 | 30 | 15 | 30 | 30 | 30 | 30 | 30 |
|  | Polyester Polyol (C) | 10 | 10 | 10 | 0 | 30 | 10 | 10 | 10 |
| Poly-isocyanate | MDI | 19.6 | 19.4 | 27.0 | 26.8 | 20.1 | 28.4 | 16.9 | 32.1 |
|  | NCO/OH molar ratio | 1.9 | 1.5 | 1.9 | 1.9 | 1.9 | 2.2 | 1.9 | 1.9 |
| Solution Characteristics | Softening Point (° C.) | 50 | 90 | 70 | 40 | 95 | 45 | 85 | 45 |
|  | Melt Viscosity | B | C | B | D | D | B | D | B |
| Leather Characteristics | Softness | B | B | D | B | D | D | B | D |
|  | Cold-resistant Flexibility | B | B | C | B | D | D | B | D |
|  | Curability (min) | 20 | 7 | 12 | >30 | 5 | 18 | >25 | 10 |

Unless otherwise specifically indicated, the unit of the numeral value in the column of formulation in the table is parts by mass.

TABLE 2

|  |  |  | PU No. |  |  |  |  |  |
|---|---|---|---|---|---|---|---|---|
|  |  |  | PU17 Example 11 | PU18 Example 12 | PU19 Example 13 | PU20 Example 14 | PU21 Example 15 | PU22 Example 16 |
| Formulation | Polyether Polyol (A) | (A-1) | 30 | 30 | 30 | 30 | 30 | 30 |
|  |  | (A-2) | 30 | 30 | 30 | 30 | 30 | 30 |
|  |  | (A-1)/(A-2) | 50/50 | 50/50 | 50/50 | 50/50 | 50/50 | 50/50 |
|  |  | Number-average Molecular Weight of (A) | 1500 | 1500 | 1500 | 1500 | 1500 | 1500 |
|  | Polyester Polyol (B) |  | 30 | 30 | 30 | 30 | 30 | 30 |
|  | Polyester Polyol (C) |  | 10 | 10 | 10 | 10 | 10 | 10 |
|  | Poly-isocyanate | MDI | 17.2 | 17.2 | 17.2 | 17.2 | 12.3 | 12.3 |
|  |  | 1,5-PDI | 4.5 | 0 | 0 | 0 | 7.6 | 0 |
|  |  | 1,6-HDI | 0 | 4.9 | 0 | 0 | 0 | 8.2 |
|  |  | IPDI | 0 | 0 | 6.5 | 0 | 0 | 0 |
|  |  | XDI | 0 | 0 | 0 | 5.5 | 0 | 0 |
|  |  | Proportion of linear aliphatic diisocyanate having 4 to 10 carbon atoms (mol%) | 30 | 30 | 0 | 0 | 50 | 50 |
|  |  | NCO/OH molar ratio | 1.9 | 1.9 | 1.9 | 1.9 | 1.9 | 1.9 |
| Solution Characteristics | Softening Point (° C.) |  | 55 | 55 | 50 | 50 | 55 | 55 |
|  | Melt Viscosity |  | A | A | B | B | A | A |
| Leather Characteristics | Softness |  | A | B | B | B | B | B |
|  | Cold-resistant Flexibility |  | B | B | C | B | B | B |
|  | Curability (min) |  | 16 | 16 | 20 | 20 | 22 | 24 |

Unless otherwise specifically indicated, the unit of the numeral value in the column of formulation in the table is parts by mass

The invention claimed is:

1. A polyurethane prepolymer produced by reacting a polyol and a polyisocyanate, wherein:
   the polyol comprises a polyether polyol (A) in an amount of 30% by mass or more based on the total mass of the polyol, a polyester polyol (B) comprising an isophthalic acid-derived structure and a sebacic acid-derived structure derived from a dibasic acid in an amount of 30% by mass or more based on the total mass of the polyol, and 5 to 20% by mass based on the total mass of the polyol of a polyester polyol (C) comprising only a sebacic acid-derived structure derived from a dibasic acid,
   the number-average molecular weight of the polyether polyol (A) is 1100 to 2400, and
   the ratio of the isocyanate equivalent of the polyisocyanate to the hydroxyl equivalent of the polyol is 2.1 or less.

2. The polyurethane prepolymer according to claim 1, wherein the polyisocyanate comprises 4,4'-diphenylmethane diisocyanate.

3. The polyurethane prepolymer according to claim 1, wherein the ratio of the isocyanate equivalent of the polyisocyanate component to the hydroxyl equivalent of the polyol is 1.5 to 2.1.

4. The polyurethane prepolymer according to claim 1, wherein the polyisocyanate comprises a linear aliphatic diisocyanate having 4 to 10 carbon atoms, and comprises the linear aliphatic diisocyanate having 4 to 10 carbon atoms in an amount of 10 to 50 mol % based on the total mol % of the polyisocyanate.

5. The polyurethane prepolymer according to claim 1, wherein the polyether polyol (A) comprises a blend of polyether polyol (A-1) having a number-average molecular weight of 700 to 1300 and a polyether polyol (A-2) having a number-average molecular weight of 2700 to 3300 in a ratio by mass of 30/70 to 70/30 such that the number-average molecular weight of the polyether polyol (A) is 1100 to 2400.

6. The polyurethane prepolymer according to claim 1, having a softening point falling within a range of 30 to 100° C. and a melt viscosity at 100° C. of 110 dPa·s or less.

7. The polyurethane prepolymer according to claim 1, comprising a polyisocyanate crosslinking agent having a terminal isocyanate group having 3 to 5 isocyanate groups in an amount of 30 parts by mass or less relative to 100 parts by mass of the polyurethane prepolymer.

8. An adhesive comprising the polyurethane prepolymer of claim 1.

9. The adhesive according to claim 8, for use for synthetic artificial leathers.

10. A synthetic artificial leather having an adhesive layer between a skin layer and a substrate, wherein the adhesive layer is a cured layer of the polyurethane prepolymer of claim 1.

* * * * *